United States Patent [19]

Herlau

[11] 4,290,173
[45] Sep. 22, 1981

[54] METHOD AND MEANS FOR RELEASABLE SECURING OF STRINGS

[76] Inventor: Henrik Herláu, 27 Vaeldegaardsvej, 2820Gentofte, Denmark

[21] Appl. No.: 941,905

[22] Filed: Sep. 13, 1978

[51] Int. Cl.³ .............................................. F16G 11/04
[52] U.S. Cl. ...................................... 24/118; 24/127; 24/130
[58] Field of Search ................. 24/117, 118, 119, 127, 24/129 B, 130, 121, 129 R, 129 D

[56] References Cited

U.S. PATENT DOCUMENTS

| D. 34,479 | 5/1901 | Yarbro | 24/121 |
|---|---|---|---|
| 603,052 | 4/1898 | Burford | 24/118 |
| 755,030 | 3/1904 | Miers | 24/121 |
| 1,549,170 | 8/1925 | Waldron | 24/117 R |
| 2,911,697 | 11/1959 | Henderson | 24/117 R |
| 3,122,805 | 3/1964 | Hakim | 24/119 |
| 3,138,839 | 6/1964 | Mathes | 24/117 R |
| 3,418,733 | 12/1968 | Tyrrell et al. | 24/117 R |
| 3,537,151 | 11/1970 | Sobel et al. | 24/117 R |

FOREIGN PATENT DOCUMENTS 1486415  11/1969  Fed. Rep. of Germany ........ 24/118

Primary Examiner—Alexander Grosz
Attorney, Agent, or Firm—Burgess, Ryan and Wayne

[57] ABSTRACT

A fastener for shoe strings, in the form of two parallel disks, with a wedge-shaped formation formed by the adjacent disk surfaces, and a hole in one of the disks through which strings can be fed to engage the wedge-shaped formation.

1 Claim, 6 Drawing Figures

METHOD AND MEANS FOR RELEASABLE SECURING OF STRINGS

The invention relates to a method for releasable securing of one or more strings such as shoe strings, tape etc. in a fastening device and a fastening device for the performance of the method.

Previously known methods for securing, for example, shoe strings in footwear, etc. have utilized a releasable knot made on the string after lacing up. This knot may in some cases be suitable and because it is learned by heart it is natural, at least for adults, to use this traditional method. However, it is a most inexpedient method especially for children and certain handicapped persons, as it may be very hard for weak fingers to lace up the strings and at the same time make a knot.

It is the object of the invention to remedy these wants and at the same time obtain certain additional advantages by means of the method, and this is achieved when the string is led through a canal in the fastening device which canal provides for free passage of the string, whereafter the front and/or back end of the string can either be led out of the canal and into a part of the fastening device, where the string is wedged tight and secured or is fixed in the canal by pressing the parts of the fastening device together and is then released either by leading the string back into the canal or by releasing the pressure of the fastening device. By means of this method a very efficient fastening of, for example, two shoe string ends is obtained, as these ends are just laced up through the fastening device, whereafter the ends are either led in a direction away from the canals and are thus wedged, or the device is actuated by pressure to press against the strings which are thus clamped in the fastening device. In this way it is unnecessary to cross the strings and make a knot while the strings are laced up. This method will make it easier for children and weak persons to tie a string in an easy and safe way. When the strings are to be released again, they are just led back into the canals and are thus released so that the strings can unimpededly be led out through the device in the opposite direction of lacing up. The releasing is particularly easy to carry out, as it does not require any strength at all, contrary to the traditional knots which may be laced up so tightly that they are very hard to release. By providing the ends of the strings with thickened portions such as knots, which are bigger than the canals, the strings are prevented from leaving the fastening device and the fastening device cannot be lost. When reusing the fastening device it is only necessary to pull the ends of the strings and secure them again in the device.

By using the fastening device according to one embodiment of the invention a most simple, inexpensive and efficient means for the performance of the method is achieved, and by making the fastening device according to another embodiment of the invention a very efficient and nice device is obtained which is both small and light.

In the following the invention will be further described with reference to the drawing in which.

Figure 1:
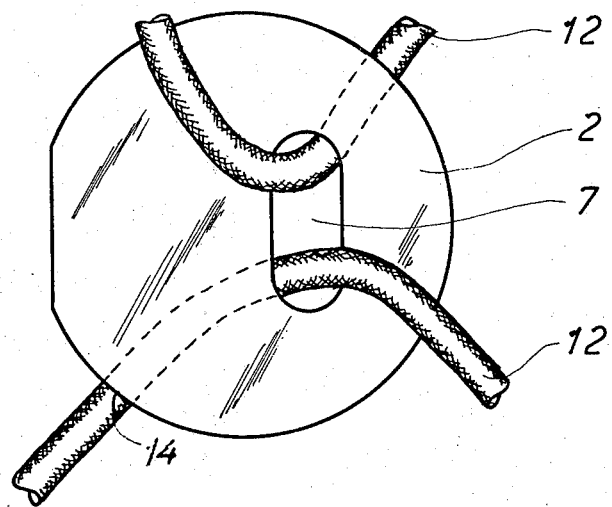
FIG. 1 shows a first embodiment of the fastening device seen from below.
Figure 2:
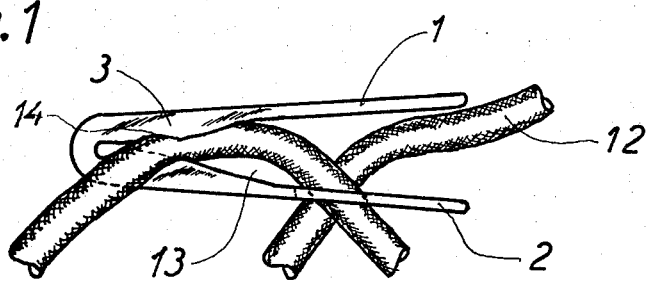
FIG. 2 shows said device seen from one side.
Figure 3:
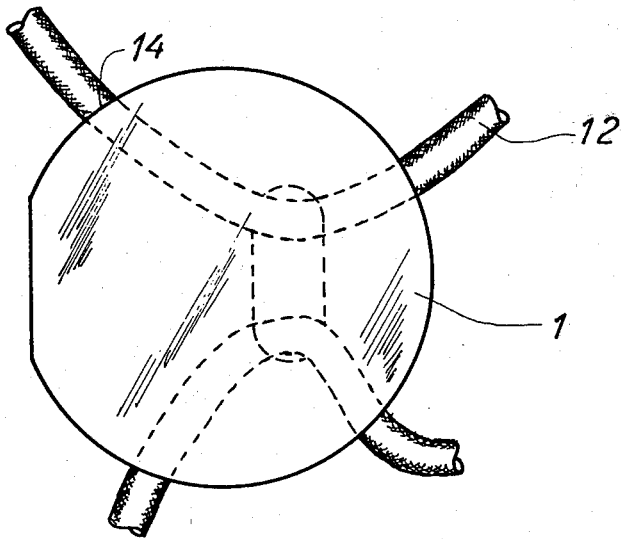
FIG. 3 shows said device seen from above.

As illustrated in FIGS. 1-3, which show a first embodiment of the device, it consists of a piece of bent metal plate which forms an upper part 1 which is connected to a lower part 2. This lower part 2 is provided at the middle with an opening 7 as an entrance for the strings 12, e.g., the ends of shoe strings. Near the bend point there are furthermore two bent edges 3 on the parts which are shaped in such a way that they form a wedge 14 as shown in FIG. 2.

The method when using this fastening device is that the ends of the strings are led through the opening in the bottom, into the space between the parts and out along the side, as shown in FIGS. 1 and 3. In this position the strings are laced up, and the fastening device is pressed down against the shoe. After lacing up the strings are led into the clamp, as shown in FIG. 2. Thus the strings are locked in the device until they are again led out of the clamp, e.g., when the shoes are to be taken off.

Figure 4:
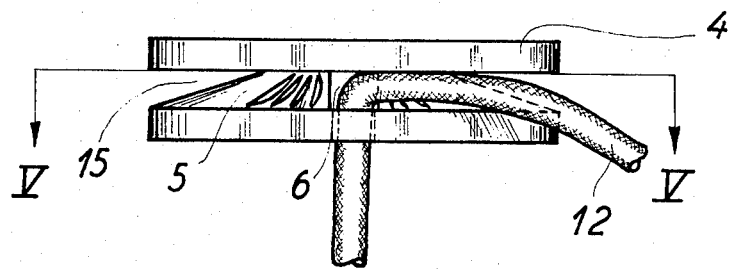
FIG. 4 shows a second embodiment of the device seen from one side.
Figure 5:
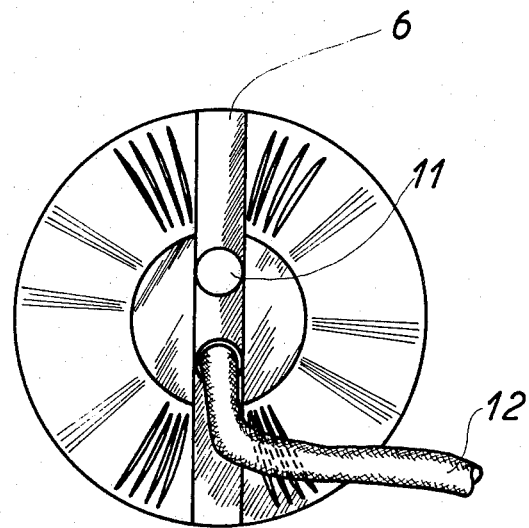
FIG. 5 shows said device in section V—V in FIG. 4.

A second embodiment is shown in FIGS. 4 and 5. The fastening device consists of a flat upper part 4 and a lower part 5 formed as a truncated cone which is assembled at the middle. Further the lower part is provided with a throughgoing canal 6 which runs diagonally through the central piece as shown in FIGS. 5 and 4. From the bottom of this canal two holes 11 run to the under side of the lower part. The string 12 is led through these holes to the canal 6 and then out.

The method when using this device is to lead the string, e.g., a shoe string, through hole and canal and then lace up. After lacing up the string is led to one side, as shown in FIG. 5, and is thus wedged into the space 15 between the parts as shown in FIG. 4. The release of this securing takes place by leading the string or the strings back to the canal 6, whereafter the strings can slide freely in the device.

Figure 6:
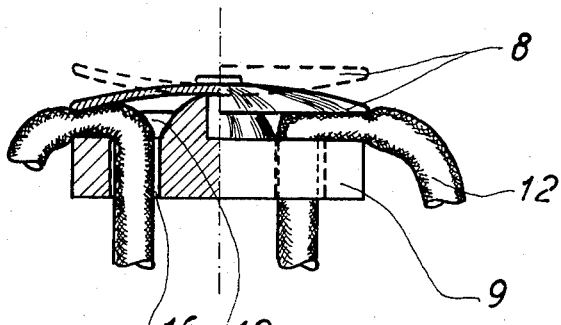
FIG. 6 shows a third embodiment of the device seen from one side partly in section.

Finally a third embodiment of the device is shown in FIG. 6. The upper part 8 consists of a piece of plate which can have two positions, namely a released position, which is shown by a dotted line, and a clamped position, which is shown by a solid line. The lower part 9 may consist of a part with an elevated central part to which the upper part is fastened. Further the lower part has one or more canals 10 which are connected with a number of openings 16 at the under side corresponding to the number of strings which are to be led through the fastening device.

The method when using this device is that the upper part is raised into the elevated position in which the strings can freely be laced up. In this laced-up position the upper part is tipped downwards whereby the strings are squeezed against the sides and the bottom of the canal, where they are secured.

When used in a shoe it might be advisable to sew the device into the wamp in order to obtain a rational manufacturing of shoe and fastening device, and thus completely avoid the loose device which is to be protected against loss by knots etc. on the free end of the string. Further the device may be dyed to match the object, it may have advertising printed on the plate, etc.

1. A fastening device for strings, comprising upper and lower disks disposed in mutual juxtaposition and having adjacent flat and frustoconical surfaces respectively, the smaller diameter planar end surface of said lower disk being coaxially secured to the flat surface of said upper disk, so that the region between said disks defines a circumferential string retaining wedge, a string receiving groove extending across a diameter of said lower disk, and at least one string-receiving hole normal to the smaller diameter planar end surface of said lower disk and extending through the larger diameter end surface thereof and communicating with said string-receiving groove.

* * * * *